US012744263B2

(12) United States Patent
Crook

(10) Patent No.: US 12,744,263 B2
(45) Date of Patent: Sep. 22, 2026

(54) CELL PHONE HEAT PROTECTOR DEVICE

(71) Applicant: Wyena Crook, Semmes, AL (US)

(72) Inventor: Wyena Crook, Semmes, AL (US)

( * ) Notice: Subject to any disclaimer, the term of this patent is extended or adjusted under 35 U.S.C. 154(b) by 739 days.

(21) Appl. No.: 18/075,798

(22) Filed: Dec. 6, 2022

(65) Prior Publication Data

US 2023/0187721 A1 Jun. 15, 2023

Related U.S. Application Data

(60) Provisional application No. 63/287,565, filed on Dec. 9, 2021.

(51) Int. Cl.
*H02J 7/00* (2006.01)
*H01M 10/613* (2014.01)
*H01M 10/623* (2014.01)

(52) U.S. Cl.
CPC ....... *H01M 10/613* (2015.04); *H01M 10/623* (2015.04)

(58) Field of Classification Search
None
See application file for complete search history.

(56) References Cited

U.S. PATENT DOCUMENTS 4,481,458 A * 11/1984 Lane .................. H01M 50/213 362/183
11,456,604 B2 * 9/2022 Hwang ................ H02J 7/0044
2012/0235636 A1 * 9/2012 Partovi ................ H02J 7/0042 320/108
2015/0037618 A1 * 2/2015 Kim ...................... A45C 13/02 429/96
2017/0019511 A1 * 1/2017 Yang ............... H04M 1/724092
2017/0110896 A1 * 4/2017 Gissin .................. H02J 7/0048
2018/0169282 A1 * 6/2018 Kusano .................. A61L 2/202

* cited by examiner

*Primary Examiner* — Arun C Williams

(57) ABSTRACT

A mobile phone protector device is described herein comprising a casing dimensioned to receive and surround a mobile phone device, the casing comprising a thermal material configured to draw heat away from the mobile phone device. The device includes a flashlight component located at a base of the casing. The casing comprises a fastener, wherein the fastener is configured to secure the mobile phone device within the casing. A lanyard is attached to the casing for use by a user in wearing the mobile phone protector device. The casing includes a rechargeable power bank, wherein the rechargeable power bank is configured to provide a charge to the mobile phone device residing within the casing.

4 Claims, 1 Drawing Sheet

CELL PHONE HEAT PROTECTOR DEVICE

RELATED APPLICATIONS

This application claims the benefit of U.S. Patent Application Ser. No. 63/287,565, filed Dec. 9, 2021.

TECHNICAL FIELD

The disclosure herein is directed to cell phone protector devices.

BACKGROUND

People constantly carry their cell phones on them and may end up leaving them in the sunlight. The phone may absorb considerable heat which can lead to overheating, ruined batteries, and permanent damage to the internal components. People may lose access to important data due to overheating phones causing internal memory to become corrupted.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

A cell phone (or mobile phone) heat protector device or case is described herein. The device comprises a specialized casing for storing mobile phones to prevent them from overheating. The casing comes in a variety of colors and is designed to prevent a phone from overheating while not in use, allowing it to be stored on a person, in a car, and in numerous other locations without worry of damage occurring due to excessive heat.

The casing may under one embodiment have an attached lanyard for securing it around the neck, wrist, or other desired locations. Phones can be secured inside the casing via a hook and loop fastener or snap mechanism flap located on a first end of the casing under an embodiment. The casing can also feature an integrated power bank, a power button, and a flashlight on the base (or on a second end opposite the first end). The casing comprises a thermal material that pulls heat away from the phone stored within and prevents overheating from occurring.

An embodiment of the cell phone protector case provides users with a storage casing for their cell phones designed to prevent overheating.

An embodiment of the cell phone protector case features a flashlight on the base and an internal power bank that can be recharged as needed. The flashlight may be located at differing positions of the casing under alterative embodiments.

An embodiment of the cell phone protector case includes a hook and loop fastener or snap fastener mechanism on the top or first side to firmly secure a phone inside the casing.

The case or casing of the cell phone protector utilizes thermal and heat-absorbent materials to pull excessive heat away from the phone when stored in the casing, under an embodiment.

An embodiment of the cell phone protector case allows users to protect their phone from excessive heat and always keep it close by via an attached lanyard that can be worn around the wrist, neck and more.

Exact size, measurement, construction, and design specifications of the cell phone protector case may vary to accommodate the various shapes and dimensions of mobile phone devices.

Figure 1:
FIG. 1 shows the protector device reflecting and/or pulling heat away from the phone when placed in a hot car, under an embodiment.

FIG. 1 shows the protector device reflecting and/or pulling heat away from the phone when placed in a hot car, under an embodiment.

Figure 2:
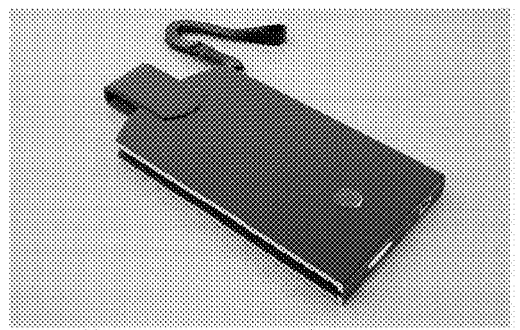
FIG. 2 shows a standalone view of a protector device, under an embodiment.

FIG. 2 shows a standalone view of a protector device, under an embodiment.

Figure 3:
FIG. 3 shows how a phone fits inside a protector device, under an embodiment.

FIG. 3 shows how a phone fits inside a protector device, under an embodiment.

Figure 4:
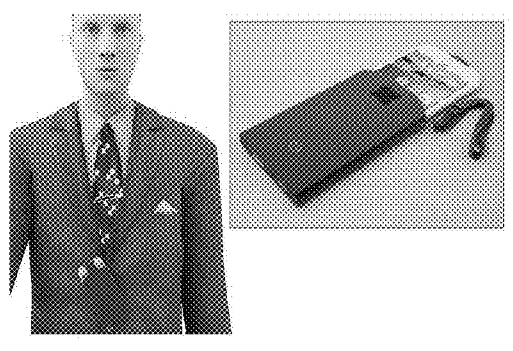
FIG. 4 shows how a phone fits inside a protector device and how a protector device can be worn around the neck via a lanyard, under an embodiment.

FIG. 4 shows how a phone fits inside a protector device and how a protector device can be worn around the neck via a lanyard, under an embodiment.

Figure 5:
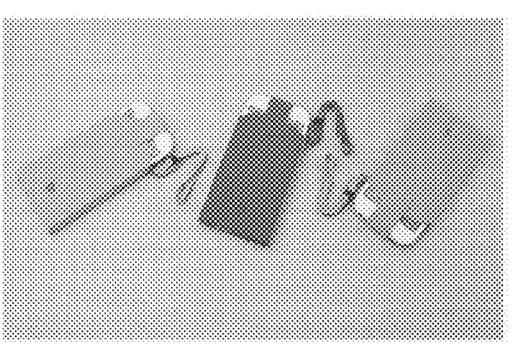
FIG. 5 shows a protector device and lanyard available in different colors, under an embodiment.

FIG. 5 shows a protector device and lanyard available in different colors, under an embodiment.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

The foregoing descriptions of specific embodiments have been presented for purposes of illustration and description. They are not intended to be exhaustive or to limit the embodiments to the precise forms disclosed, and obviously many modifications and variations are possible in light of the above teaching.

A mobile phone protector device is described herein comprising a casing dimensioned to receive and surround a mobile phone device, the casing comprising a thermal material configured to draw heat away from the mobile phone device.

A flashlight component is located at a base of the casing under an embodiment.

The casing of an embodiment comprises a fastener, wherein the fastener is configured to secure the mobile phone device within the casing, under an embodiment.

A lanyard of an embodiment is attached to the casing for use by a user in wearing the mobile phone protector device.

The casing of an embodiment includes a rechargeable power bank, wherein the rechargeable power bank is configured to provide a charge to the mobile phone device residing within the casing.

The fastener of an embodiment is a hook and loop fastener, under an embodiment.

The fastener of an embodiment is a snap mechanism flap, under an embodiment.

At least a portion of the casing comprises a reflective surface, under an embodiment.

What is claimed is:

1. A mobile phone protector device comprising, a casing dimensioned to receive and surround a mobile phone device, the casing comprising a thermal material configured to draw heat away from the mobile phone device;

a flashlight component at a base of the casing;

the casing comprising a fastener, wherein the fastener is configured to secure the mobile phone device within the casing;

a lanyard attached to the casing for use by a user in wearing the mobile phone protector device; and the casing including a rechargeable power bank, wherein the rechargeable power bank is configured to provide a charge to the mobile phone device residing within the casing.

2. The mobile phone device of claim 1, wherein the fastener is a hook and loop fastener.

3. The mobile phone device of claim 1, wherein the fastener is a snap mechanism flap.

4. The mobile phone device of claim 1, wherein at least a portion of the casing comprises a reflective surface.

* * * * *